3,681,289
CLEAR COATING SYSTEM COMPRISING AN
ISOCYANATE CURED TERPOLYMER
Uno Kruse, Neptune, and Daniel F. Herman and Rudolph
S. Wilsher, Princeton, N.J., assignors to N L Industries,
Inc., New York, N.Y.
No Drawing. Filed Jan. 22, 1970, Ser. No. 5,142
Int. Cl. C08g 22/16, 41/00; C09d 3/72
U.S. Cl. 260—77.5 CR                              5 Claims

ABSTRACT OF THE DISCLOSURE

A clear coating system comprising an isocyanate cured terpolymer of hydroxyethyl methacrylate, ethylhexyl acrylate and diacetone acrylamide, useful, inter alia, for protecting wood surfaces; and process for making same.

BACKGROUND AND SUMMARY OF THE INVENTION

Presently marked unpigmented wood finishes are based on either alkyd, phenolic, epoxy or polyurethane vehicle systems. These coating systems do not provide adequate protection in the areas of plywood coatings and exterior coatings. Plywood is characterized by conditions of relatively great stress which causes prior art finishes to chip, crack, peel and blister. As external coatings for use on, say, redwood and cedar, these finishes tend to discolor and to lose adhesion and tensile strength when exposed to weather.

A durable, unpigmented, clear finish would find ready market acceptance if it could perform well generally and if, in addition, it could withstand the stress conditions of plywood and the deteriorating effects of weather.

In light of the above, it is an object of this invention to provide a durable, clear coating system which is highly resistant to the stress factors present in plywood and to the deteriorating effects of weather. It is also an object to provide a protective coating system for all wood surfaces. Other objects and advantages will become evident from a reading of the following more complete description and claims.

The objects are met by reacting a terpolymer comprising 10 to 30 mole percent hydroxyethyl methacrylate, 10 to 40 mole percent ethylhexyl acrylate and 30 to 80 mole percent diacetone acrylamide with a polyisocyanate to form a hard, durable, clear coating system.

DESCRIPTION OF THE PREFERRED EMBODIMENTS

A typical process for preparing the novel coatings is to heat the monomers together in the presence of a polymerization catalyst and a suitable solvent for the terpolymer which is formed. Then the terpolymer-solvent combination is mixed with a polyisocyanate which, by means of an addition reaction at the locus of the pendant hydroxyl groups, forms a polyurethane which upon evaporation of the solvent, dries clear and hard. It is preferred to employ a catalyst to improve polymerization rates. It is also preferred to polymerize the monomer in the presence of a solvent for the terpolymer. If a solvent is not present during polymerization, it will be necessary to dissolve the formed polymer before reaction with the polyisocyanate.

The preferred monomer combination comprises hydroxyethyl methacrylate, ethylhexyl acrylate and diacetone acrylamide. Within the specific levels of use herein disclosed, each of these monomers contributes its own set of characteristics to the terpolymer portion of the coating. The result is a novel terpolymer which forms a hard, tough, clear coating when reacted with a polyisocyanate as taught herein.

Consistent with providing a proper balance of physical properties, minor amounts of other monomers may be substituted for some of the hydroxyethyl methacrylate and ethylhexyl acrylate. For instance, hydroxypropyl methacrylate and 2,3 dihydroxypropyl methacrylate may be substituted for some only of the hydroxyethyl methacrylate. The dihydroxypropyl methacrylate is best employed in small amounts to increase the incidence of crosslinking between the terpolymer and the polyisocyanate.

Exemplary of the monomers or monomer combinations which can be employed in small amounts for some only of the ethylhexyl acrylate are: methyl methacrylate, butyl methacrylate, ethyl acrylate and butyl acrylate. However, see Item D of the table below. If the ethylhexyl acrylate component of the novel terpolymer is replaced completely by butyl methacrylate, for instance, coated panels fail after only two cycles of the boiling water torture test which will be explained more fully hereafter.

The preferred monomer combinations in the mole percentages taught herein are characterized by attributes of strength, flexibility, good adhesion and moisture transmission or breathability. It is the proper combination of these characteristics which helps influence the ultimate character of the final coating.

The hydroxyethyl methacrylate provides the hydroxyl sites from which polymerization occurs and at which the polyisocyanate attaches for over-all film strength. The ethylhexyl acrylate provides flexibility and good adhesion properties and the diacetone acrylamide provides breathability and water tolerance. The combination of these particular coating attributes means that moisture coming from the wood or from behind the wood will exit through the coating without lifting it from beneath. Hence, conditions of surface cracking, peeling, chipping and blistering will be substantially completely eliminated. Furthermore, the coating will adapt by reason of its flexibility and strength to changes in dimension of the substrate. For instance, cracking or checking in the substrate, which may be plywood, does not mean that the coating will crack. Rather, the cracks which may develop in the wood will be bridged by the coating so that the integrity of the coating and the protection it offers will not be affected.

All terpolymer components must be vinyl compounds because the reaction process for forming the polyol (hydroxyl containing terpolymer) is one of vinyl polymerization. When monomers other than those which are preferred are intended to be used with the preferred starting materials, they should be carefully evaluated on the basis of the desired film characteristics as explained above. Those skilled in the art having the guidelines herein set out will be able to conclude what combinations will prove useful and in what concentrations they should be employed.

The mole percentages of the preferred monomers of this invention may vary as follows:

| Monomer: | Mole percent |
|---|---|
| Hydroxyethyl methacrylate | 10–30 |
| Ethylhexyl acrylate | 10–40 |
| Diacetone acrylamide | 30–80 |

However, for best results, percentages will be maintained within these ranges:

| Monomer: | Mole percent |
|---|---|
| Hydroxyethyl methacrylate | 15–20 |
| Ethylhexyl acrylate | 20–30 |
| Diacetone acrylamide | 50–60 |

Polymerization catalysts are desirably employed to speed up the polymerization rates of the novel terpolymers. It is preferred to use p-menthane hydroperoxide although other similar catalysts such as cumene hydroperoxide, benzoyl peroxide, acetyl peroxide, azobisisobutyronitrile, and the like may be employed. For best results catalyst concentrations of from 0.1 to 5%, by weight of the polymer, should be employed. Higher catalyst levels will give lower molecular weight polymers which do not perform as well. In addition, a chain stopper may be employed with the catalyst to help regulate molecular weight. For instance, low levels of dodecyl mercaptan may be used as would be apparent to those skilled in the art.

Polymer solvents such as xylene, Cellosolve acetate, toluene, butyl acetate and combinations thereof may be employed. A combination of xylene and Cellosolve acetate is preferred. Depending on the reactants and the catalysts and solvents employed, polymerization may be carried out over a broad range of temperatures. For instance, with azobisisobutyronitrile as catalyst (AZBN), best polymerization rates are obtained when polymerization temperatures are maintained at about 70° C. With cumene hydroperoxide, temperatures are best maintained at about 150° C. for most efficient polymerization.

Typical of the polyisocyanates contemplated to be used herein is an adduct of 3 moles of tolylene diisocyanate and 1 mole of trimethylol propane. The term polyisocyanate is meant to include aliphatic and aromatic isocyanates, blocked isocyanates and isocyanate prepolymers. For films of especially high levels of flexibility, isocyanate terminated prepolymers with a functionality as low as two may be used alone or in conjunction with polyisocyanates of higher functionality. The prepolymers of low functionality may be formed, for example, by the reaction of a diisocyanate with hydroxyl capped short chain polymers. These short chain polymers may be based upon polyesters, polyethers and the like.

The blocked isocyanates useful in the practice of this invention include those which are unblockable by heat. Thus, when the coating is to be applied to a metal substrate, the coating will not harden until brought to curing temperature. It is preferred to employ the polyisocyanate adduct and the terpolymer in such amounts that there will be a molar ratio of 1.1/1 (—NCO/—OH). Other isocyanate combinations and ratios may be employed as will be readily evident to those skilled in the art. Contemplated uses of the products of this invention are also in concrete, leather, textile and metal coating applications.

Example 1

Twenty-six grams of hydroxyethyl methacrylate, 36.8 grams of 2-ethylhexyl acrylate and 101.5 grams of diacetone acrylamide (a molar ratio of 20:20:60, respectively), were dissolved in a flask containing 75 grams of xylene and 50 grams of Cellosolve acetate. After heating and deaeration under nitrogen, 3.2 grams of p-menthane hydroperoxide and 0.32 gram of dodecyl mercaptan were added and the flask was again deaerated.

This monomer mix was added over a one-half-hour period to a resin flask charged with 25 grams xylene and 50 grams Cellosolve acetate with agitation and with the temperature maintained at 115° C. Cellosolve is a trademark of Union Carbide for ethylene glycol monoethyl ether. The polymerization reaction proceeded for an additional three hours at which time the solution viscosity was between 9 to 11 poises. Then the contents of the flask, containing 45% terpolymer solution, was cooled and bottled. The hydroxyl value of the solution was 29.4. To this solution was added a 60% solution of the reaction product of 3 moles of tolylene diisocyanate and 1 mole of trimethylol propane, to obtain a ratio of polyisocyanate to terpolymer of 1.1/1 (—NCO/—OH), respectively. The resultant coating composition was then diluted with Cellosolve acetate to a solids level of 40% for easy brushability.

Example 2

The procedure of Example 1 was followed except that the monomer additions were varied to give a terpolymer with a molar ratio of 20:30:50, hydroxyethylmethacrylate (HEMA):ethylhexyl acrylate (EHA):diacetone acrylamide (DAA), respectively. The OH value of the 45% solution was 30.

Example 3

The procedure of Example 1 was followed to obtain a terpolymer of 20:20:60 molar ratio, HEMA:EHA:DAA. Acetyl peroxide catalyst was employed.

Example 4

The procedure of Example 1 was followed to obtain a terpolymer of 20:20:60 molar ratio, HEMA:EHA:DAA. Cumene hydroperoxide catalyst was employed.

Example 5

The procedure of Example 1 was followed to obtain a terpolymer of 20:20:60 molar ratio, HEMA:EHA:DAA. Azobisisobutyronitrile catalyst was employed.

Boiling water torture test

The American Plywood Association has set up a series of tests referred to as "torture tests" because of the severe type of failure produced. Coatings are considered to have failed when the cracks in the coating reach a cumulative length of 6 inches per panel.

The test consists of coating 3" x 6" exterior grade ⅜ inch plywood panels. Edges and backs of the panels are left uncoated. For each test cycle, the panels are immersed for 4 hours in boiling water, followed by 20 hours drying in an oven at 65° C. Coatings are considered to have successfully passed the test when they sustain 25 cycles without cracking to a cumulative length of 6 inches per panel.

The coatings made according to Examples 1–5 were brushed onto plywood panels to a thickness of 5 mils. The panels dried clear and hard and were then subjected to the boiling water torture test with the results shown in the table below. Also shown are results obtained under the same conditions and at the same coating thickness using commercially marketed clear coatings (A and B) and clear coatings which are fairly used for comparative purposes (C, D and E).

TABLE

| Example No. | HEMA:EHA:DAA | Boiling test cycles withstood |
|---|---|---|
| 1 | 20:20:60 | 25 |
| 2 | 20:20:50 | 25 |
| 3 | 20:20:60 | 25 |
| 4 | 20:20:60 | 24 |
| 5 | 20:20:60 | 25 |

| Other clear coatings | Type | |
|---|---|---|
| A | Marine spar varnish | 1 |
| B | Polyester-polyisocyanate adduct | 12 |
| C | Hydroxyethyl methacrylate-butyl methacrylate (20:80) polyurethane | 1 |
| D | Hydroxyethyl methacrylate-butylmethacrylate-diacetone acrylamide (20:20:60) polyurethane | 2 |
| E | Hydroxyethyl methacrylate-diacetone acrylamide (20:80) polyurethane | 8 |

From the table one can see the advantages of the novel clear coatings over the commercial coatings (A and B) and the comparative coatings (C, D and E). It is deemed significant that, heretofore, no clear solvent-based coating has been able to pass this extreme test. As the table shows, the novel coatings withstand at least twice as many boiling water test cycles as the representative commercial polyester-polyisocyanate adduct. It is also important that the plywood panels protected with the novel coating system of this invention passed the tests with substantially no loss in coating hardness, clarity or gloss.

We claim:

1. A coating comprising the reaction product of (a) an organic polyisocyanate and (b) a terpolymer comprising from 10 to 30 mole percent hydroxyethyl methacrylate, from 10 to 40 mole percent ethylhexyl acrylate and from 30 to 80 percent diacetone acrylamide, wherein the ratio of (a) and (b) is 1.1 to 1, —NCO/—OH, respectively.

2. The coating of claim 1 wherein the terpolymer comprises from 15 to 20 mole percent hydroxyethyl methacrylate, from 20 to 30 mole percent ethylhexyl acrylate and from 50 to 60 mole percent diacetone acrylamide.

3. A coating comprising the reaction product of (a) an organic polyisocyanate adduct of 3 moles of tolylene diisocyanate and 1 mole of trimethylol propane and (b) a terpolymer comprising from 15 to 20 mole percent hydroxyethyl methacrylate, from 20 to 30 mole percent ethylhexyl acrylate and from 50 to 60 mole percent diacetone acrylamide, wherein the ratio of (a) and (b) is 1.1 to 1, —NCO/—OH, respectively.

4. A method for preparing a coating comprising reacting an organic polyisocyanate with a solution of terpolymer comprising from 10 to 30 mole percent hydroxyethyl methacrylate, from 10 to 40 mole percent ethylhexyl acrylate and from 30 to 80 mole percent diacetone acrylamide in a ratio of 1.1 to 1, —NCO/—OH, respectively.

5. A substrate coated with the reaction product of (a) an organic polyisocyanate adduct of 3 moles of tolylene diisocyanate and 1 mole of trimethylol propane and (b) a terpolymer comprising from 15 to 20 mole percent hydroxyethyl methacrylate, from 20 to 30 mole percent ethylhexyl acrylate and from 50 to 60 mole percent diacetone acrylamide, wherein the ratio of (a) and (b) is 1.1 to 1, —NCO/—OH, respectively.

References Cited
UNITED STATES PATENTS

| | | | |
|---|---|---|---|
| 3,248,373 | 4/1966 | Barringer | 260—77.5 |
| 3,497,467 | 2/1970 | Coleman | 260—80.73 |
| 3,523,093 | 8/1970 | Stamberger | 260—77.5 |
| 3,532,652 | 10/1970 | Zang et al. | 260—77.5 |

DONALD E. CZAJA, Primary Examiner

R. W. GRIFFIN, Assistant Examiner

U.S. Cl. X.R.

117—148, 161 KP, DIG. 7; 260—63 UY, 77.5 AP